US011153837B2

(12) United States Patent
Abedini et al.

(10) Patent No.: US 11,153,837 B2
(45) Date of Patent: Oct. 19, 2021

(54) SYNCHRONIZATION FOR WIRELESS COMMUNICATION SYSTEMS

(71) Applicant: QUALCOMM Incorporated, San Diego, CA (US)

(72) Inventors: Navid Abedini, Raritan, NJ (US); Saurabha Rangrao Tavildar, Jersey City, NJ (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/790,908

(22) Filed: Jul. 2, 2015

(65) Prior Publication Data

US 2017/0006568 A1    Jan. 5, 2017

(51) Int. Cl.
*H04W 56/00* (2009.01)
*H04W 76/14* (2018.01)
*H04B 7/185* (2006.01)

(52) U.S. Cl.
CPC ........ *H04W 56/0025* (2013.01); *H04B 7/185* (2013.01); *H04W 56/0015* (2013.01); *H04W 76/14* (2018.02)

(58) Field of Classification Search
None
See application file for complete search history.

(56) References Cited

U.S. PATENT DOCUMENTS

| 7,079,075 B1* | 7/2006 | Connor | G01C 15/00 |
| | | | 342/357.41 |
| 7,202,813 B2* | 4/2007 | Bird | G01S 19/04 |
| | | | 342/357.41 |
| 7,212,157 B2* | 5/2007 | Lee | G01S 19/06 |
| | | | 342/357.46 |
| 7,271,766 B2* | 9/2007 | Zimmerman | G01S 1/24 |
| | | | 342/357.27 |
| 7,292,183 B2* | 11/2007 | Bird | G01S 19/04 |
| | | | 342/357.41 |

(Continued)

FOREIGN PATENT DOCUMENTS

| CN | 102183771 A | 9/2011 |
| CN | 103828398 A | 5/2014 |

(Continued)

OTHER PUBLICATIONS

U.S. Appl. No. 62/062,551, filed Oct. 10, 2014, Sorrentino et al., Signal Quality Measurement for Device-to-Device Communication.*

(Continued)

*Primary Examiner* — Gregory B Sefcheck
(74) *Attorney, Agent, or Firm* — Procopio, Cory, Hargreaves & Savitch LLP

(57) ABSTRACT

A method, an apparatus, and a computer program product for wireless communication are provided. The apparatus determines that a first external timing source timing signal is available at a first UE. The apparatus also synchronizes the first UE using the first external timing source based timing signal when the first external timing source timing signal is available. Additionally, the apparatus transmits a synchronization signal indicating that the first UE is synchronized using an external timing source timing signal.

20 Claims, 10 Drawing Sheets

(56) References Cited

U.S. PATENT DOCUMENTS

| | | | | |
|---|---|---|---|---|
| 7,304,981 | B2* | 12/2007 | Yoon | H04B 7/2693 370/324 |
| 7,315,278 | B1* | 1/2008 | Bauregger | G01S 19/10 342/357.27 |
| 7,336,225 | B1* | 2/2008 | Connor | G01C 15/00 342/357.41 |
| 7,339,525 | B2* | 3/2008 | Zimmerman | G01S 5/0009 342/357.27 |
| 7,385,554 | B2* | 6/2008 | Zimmerman | G01S 1/24 342/357.27 |
| 7,532,160 | B1* | 5/2009 | Zimmerman | G01S 19/11 342/357.27 |
| 7,656,352 | B2* | 2/2010 | Alban | G01S 19/04 342/458 |
| 7,729,336 | B2* | 6/2010 | Pun | H04W 56/0015 370/350 |
| 7,876,790 | B2* | 1/2011 | Cho | H04J 3/0697 370/503 |
| 8,024,390 | B2* | 9/2011 | Bickel | G01D 4/002 708/422 |
| 8,031,818 | B2* | 10/2011 | Lee | H04L 27/266 375/344 |
| 8,199,049 | B2* | 6/2012 | Talbot | G01S 19/22 342/357.26 |
| 8,358,242 | B2* | 1/2013 | Talbot | G01S 19/04 342/357.26 |
| 8,358,607 | B2* | 1/2013 | Duval | H04B 7/18517 370/315 |
| 8,406,135 | B2* | 3/2013 | Pickering | H04L 12/2856 370/232 |
| 8,565,169 | B2* | 10/2013 | Tavildar | H04W 56/0015 370/329 |
| 8,730,844 | B2* | 5/2014 | Johnson | H04W 4/006 370/255 |
| 8,774,230 | B2* | 7/2014 | Gheorghiu | H04W 56/0015 370/509 |
| 8,787,954 | B2* | 7/2014 | Richardson | H04W 56/0015 455/502 |
| 8,923,226 | B2* | 12/2014 | Tavildar | H04W 56/0015 370/329 |
| 9,179,269 | B2* | 11/2015 | Lee | H04W 56/005 |
| 9,198,092 | B2* | 11/2015 | Soliman | H04W 36/0055 |
| 9,450,691 | B2* | 9/2016 | Stahlin | H04J 3/0638 |
| 9,455,824 | B1* | 9/2016 | Tujkovic | H04W 56/004 |
| 9,513,388 | B2* | 12/2016 | Guichard | G01V 1/26 |
| 9,516,595 | B2* | 12/2016 | Abraham | H04W 52/0225 |
| 9,541,648 | B2* | 1/2017 | Ralphs | G01S 19/14 |
| 9,565,645 | B1* | 2/2017 | Burford | H04W 56/001 |
| 9,693,338 | B2* | 6/2017 | Zhao | H04W 72/04 |
| 9,736,798 | B2* | 8/2017 | Sorrentino | H04W 52/383 |
| 9,820,111 | B2* | 11/2017 | Morita | H04W 72/10 |
| 9,860,860 | B2* | 1/2018 | Sheng | H04W 56/0005 |
| 9,877,267 | B2* | 1/2018 | Kim | H04W 40/10 |
| 9,893,855 | B2* | 2/2018 | Kim | H04L 5/0048 |
| 10,091,709 | B2* | 10/2018 | Yang | H04W 56/001 |
| 10,271,293 | B2* | 4/2019 | Vandwalle | H04W 56/0015 |
| 10,281,588 | B2* | 5/2019 | Ashjaee | G01S 19/43 |
| 10,321,424 | B2* | 6/2019 | Zhang | H04W 56/0065 |
| 10,341,971 | B2* | 7/2019 | Byun | H04W 56/0015 |
| 10,542,509 | B2* | 1/2020 | Gunnarsson | H04W 76/14 |
| 10,548,106 | B2* | 1/2020 | Chae | H04W 56/0015 |
| 10,575,269 | B2* | 2/2020 | Chae | H04W 56/0015 |
| 10,805,891 | B2* | 10/2020 | Park | H04W 72/10 |
| 2002/0011948 | A1* | 1/2002 | Weedon | G01C 5/005 342/357.62 |
| 2009/0122782 | A1* | 5/2009 | Horn | H04W 56/001 370/350 |
| 2009/0196277 | A1* | 8/2009 | Horn | H04J 3/0679 370/350 |
| 2012/0195253 | A1 | 8/2012 | Irvine | |
| 2013/0059592 | A1* | 3/2013 | Chakraborty | H04W 56/0015 455/444 |
| 2013/0077512 | A1* | 3/2013 | Chang | H04W 56/001 370/252 |
| 2013/0315226 | A1* | 11/2013 | Bombelli | H04W 56/0015 370/350 |
| 2014/0119410 | A1 | 5/2014 | Tian et al. | |
| 2015/0089051 | A1* | 3/2015 | Ojanpera | H04S 3/004 709/224 |
| 2015/0271720 | A1* | 9/2015 | Yamada | H04W 76/023 370/331 |
| 2015/0330779 | A1* | 11/2015 | Moeglein | G01C 5/06 342/462 |
| 2015/0382324 | A1* | 12/2015 | Sheng | H04W 72/02 370/329 |
| 2016/0212721 | A1* | 7/2016 | Sheng | H04W 48/16 |
| 2017/0245229 | A1* | 8/2017 | Seo | H04W 24/04 |
| 2018/0054253 | A1* | 2/2018 | Seo | H04B 17/318 |
| 2018/0084478 | A1* | 3/2018 | Lee | H04W 40/12 |

FOREIGN PATENT DOCUMENTS

| | | |
|---|---|---|
| CN | 104620551 A | 5/2015 |
| JP | 2011176549 A | 9/2011 |
| KR | 20130029355 A | 3/2013 |
| WO | 2010145080 A1 | 12/2010 |
| WO | 2014158064 A1 | 10/2014 |
| WO | 2014182342 A1 | 11/2014 |
| WO | 2015010542 A1 | 1/2015 |
| WO | 2015046264 A1 | 4/2015 |

OTHER PUBLICATIONS

U.S. Appl. No. 61/931,686, filed Jan. 26, 2014, Kim et al., "D2D Synchronization Channel Design".*

U.S. Appl. No. 61/939,685, filed Feb. 13, 2014, Kim et al., "D2D Synchronization Channel Design".*

U.S. Appl. No. 62/067,441, filed Oct. 23, 2014, Kim et al., "Clustering method considering power efficiency and link reliability for disaster communication network".*

U.S. Appl. No. 62/034,125, filed Aug. 6, 2014, Sheng et al., "Synchronization Signals for Device-to-Device Communications".*

U.S. Appl. No. 62/018,208, filed Jun. 27, 2014, Sheng et al., "Priority-based Mode 2 Resource Pool Access for Device to Device Communications".*

U.S. Appl. No. 62/104,365, filed Jan. 16, 2014, Sheng et al., "Method and Apparatus for Selecting a Synchronization Signal Source for Device-to-Device Communications".*

U.S. Appl. No. 62/096,887, "Relaying Indicator and Request", Seo, filed Dec. 25, 2014.*

International Search Report and Written Opinion—PCT/US2016/035837—ISA/EPO—dated Dec. 2, 2016.

European Search Report—EP19164009—Search Authority—The Hague—dated May 31, 2019.

LG Electronics: "Discussion on Synchronization and Discovery Enhancements for UE-to-Network Relay", 3GPP TSG-RAN WG1 Meeting #80bis, 3GPP Draft; R1-151508, 3rd Generation Partnership Project (3GPP), Mobile Competence Centre; 650, Route Des Lucioles, vol. RAN WG1, No. Belgrade, Serbia; Apr. 20, 2015-Apr. 24, 2015, Apr. 19, 2015, pp. 1-3, XP050934380, Retrieved from the Internet: URL: http://www.3gpp.org/ftp/Meetings_3GPP_SYNC/RAN1/Docs/ [retrieved on Apr. 19, 2015].

Taiwan Search Report—TW105117607—TIPO—dated Jan. 17, 2020.

LG Electronics: "Synchronization Enhancements for UE-to-network relay operation", 3GPP TSG RAN WG1 Meeting #81, R1-152722, Fukuoka, Japan, May 25-29, 2015, pp. 1-3.

Ericsson: "Scenarios and Solutions for Radio-Interface Based Small Cell Synchronization", 3GPP Draft, 3GPP TSG RAN WG1 Meeting #76bis, R1-141644, Shenzhen, China, Mar. 31-Feb. 4, 2014, 6 Pages.

(56) References Cited

OTHER PUBLICATIONS

Jie R., "Research and Improvement on the Availability of GNSS Receiver Positioning Algorithm", Beijing University of Posts and Telecommunications, Apr. 30, 2015, 123 Pages.

* cited by examiner

SYNCHRONIZATION FOR WIRELESS COMMUNICATION SYSTEMS

BACKGROUND

Field

The present disclosure relates generally to communication systems, and more particularly, to a synchronization for wireless communication systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus determines that a first external timing source timing signal is available at a first UE. The apparatus also synchronizes the first UE using the first external timing source based timing signal when the first external timing source timing signal is available. Additionally, the apparatus transmits a synchronization signal indicating that the first UE is synchronized using an external timing source timing signal.

In another aspect of the disclosure, a method, a computer program product, and an apparatus are provided. The apparatus receives one or more synchronization signals including synchronization information indicating a priority of the synchronization signals. Additionally, the apparatus determines which of the one or more synchronization signals to synchronize on based on the information indicating the priority of the synchronization signal. The apparatus also synchronizes on one of the one or more synchronization signals.

DETAILED DESCRIPTION

Figure 1:
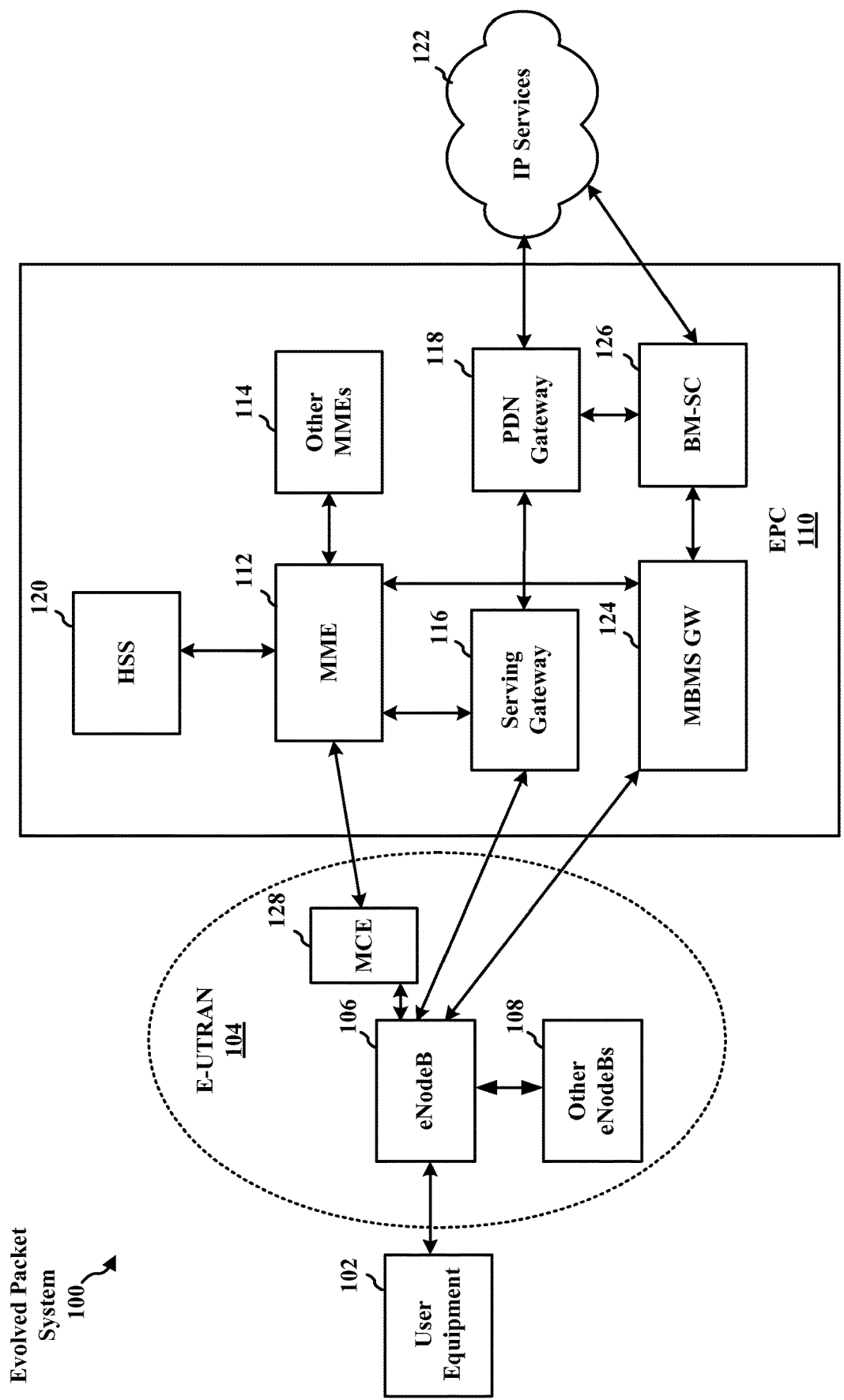
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

The systems and methods described herein may be implemented in the evolved packet system 100 of FIG. 1. For example, an apparatus may synchronize the UE 102 using the first external timing source based timing signal when the first external timing source timing signal is available. Example timing signals include, but are not limited to signals from Global Navigation Satellite System (GNSS) such as global positioning system (GPS), Global Navigation Satellite System (GLONASS), Galileo, BeiDou, or other satellite based navigation systems. Timing signals may also be transmitted from terrestrial sources, such as the eNodeB 106 of FIG. 1. The timing signal from the eNodeB 106 may be generated locally or received from other timing sources. For example, the eNodeB 106 may generate a timing signal from GNSS or other signals. Additionally, the apparatus transmits a synchronization signal indicating that the first UE is synchronized using the external timing source timing signal.

Another example apparatus, e.g., UE 102, receives one or more synchronization signals including synchronization information indicating a priority of the synchronization signals. Additionally, the apparatus determines which of the one or more synchronization signals to synchronize on based on the information indicating the priority of the synchronization signal. The apparatus also synchronizes on one of the one or more synchronization signals.

Figure 2:
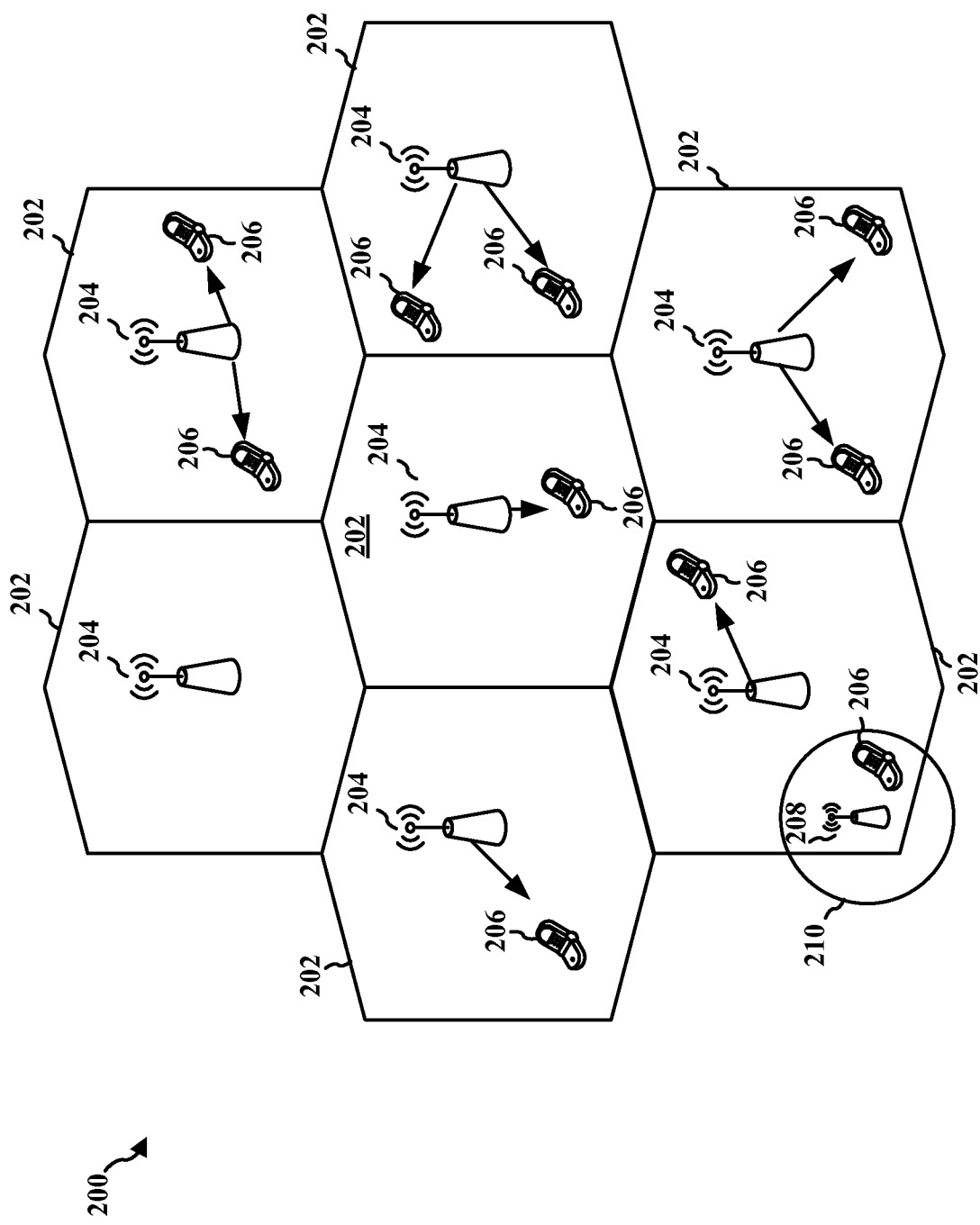
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femtocell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL, and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The systems and methods described herein may be implemented in an access network 200 in an LTE network architecture as illustrated in FIG. 2. For example, an apparatus, e.g., at eNBs 204, may synchronize the UE 206 using the first external timing source based timing signal when the first external timing source timing signal is available. Additionally, the apparatus transmits a synchronization signal indicating that the first UE is synchronized using the external timing source timing signal.

Another example apparatus, e.g., UE 206, receives one or more synchronization signals including synchronization information indicating a priority of the synchronization signals. Additionally, the apparatus determines which of the one or more synchronization signals to synchronize on based on the information indicating the priority of the synchronization signal. The apparatus also synchronizes on one of the one or more synchronization signals.

Figure 3:
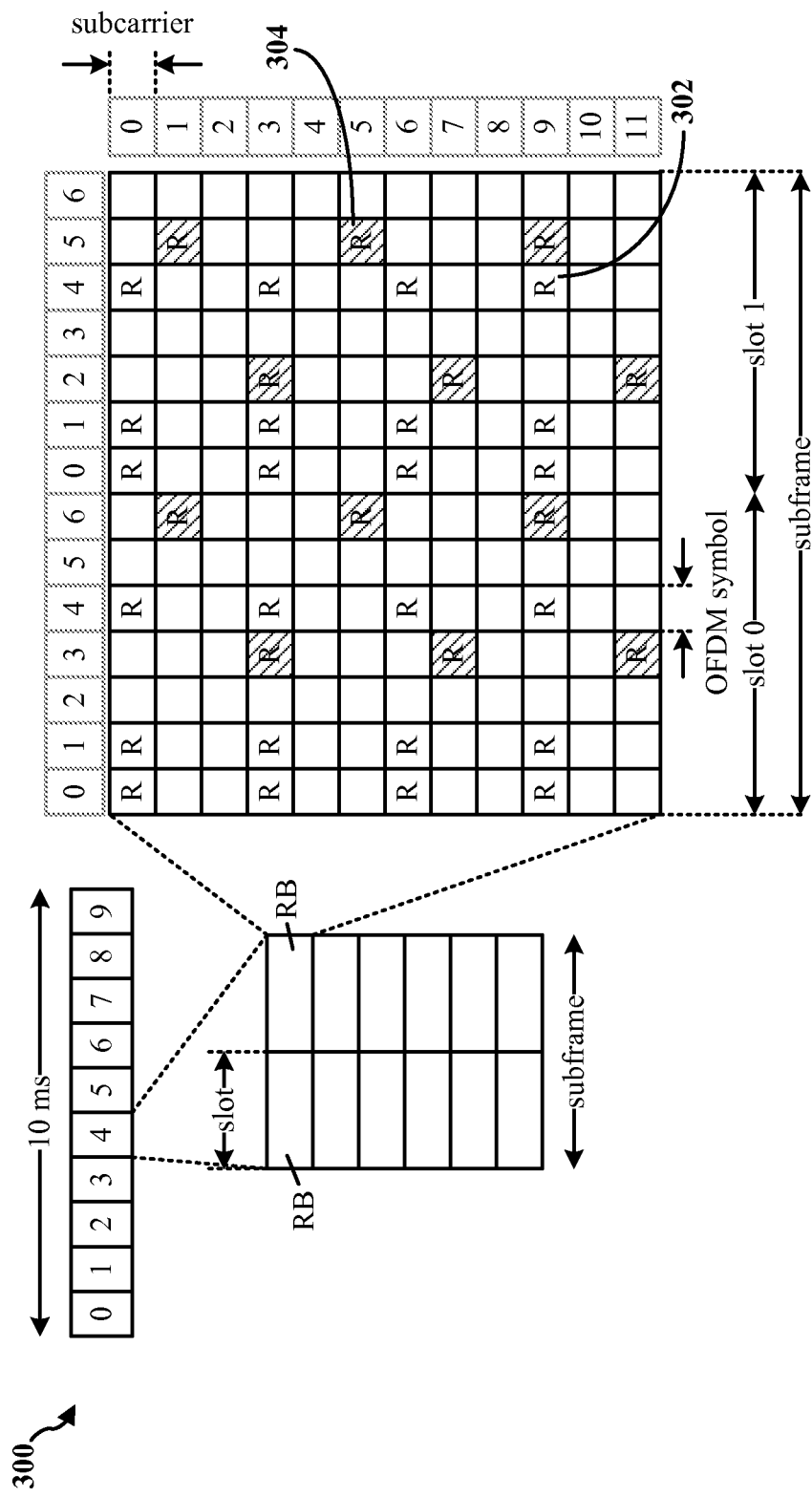
FIG. 3 is a diagram illustrating an example of a DL frame structure in LTE.

FIG. 3 is a diagram 300 illustrating an example of a DL frame structure in LTE. A frame (10 ms) may be divided into 10 equally-sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
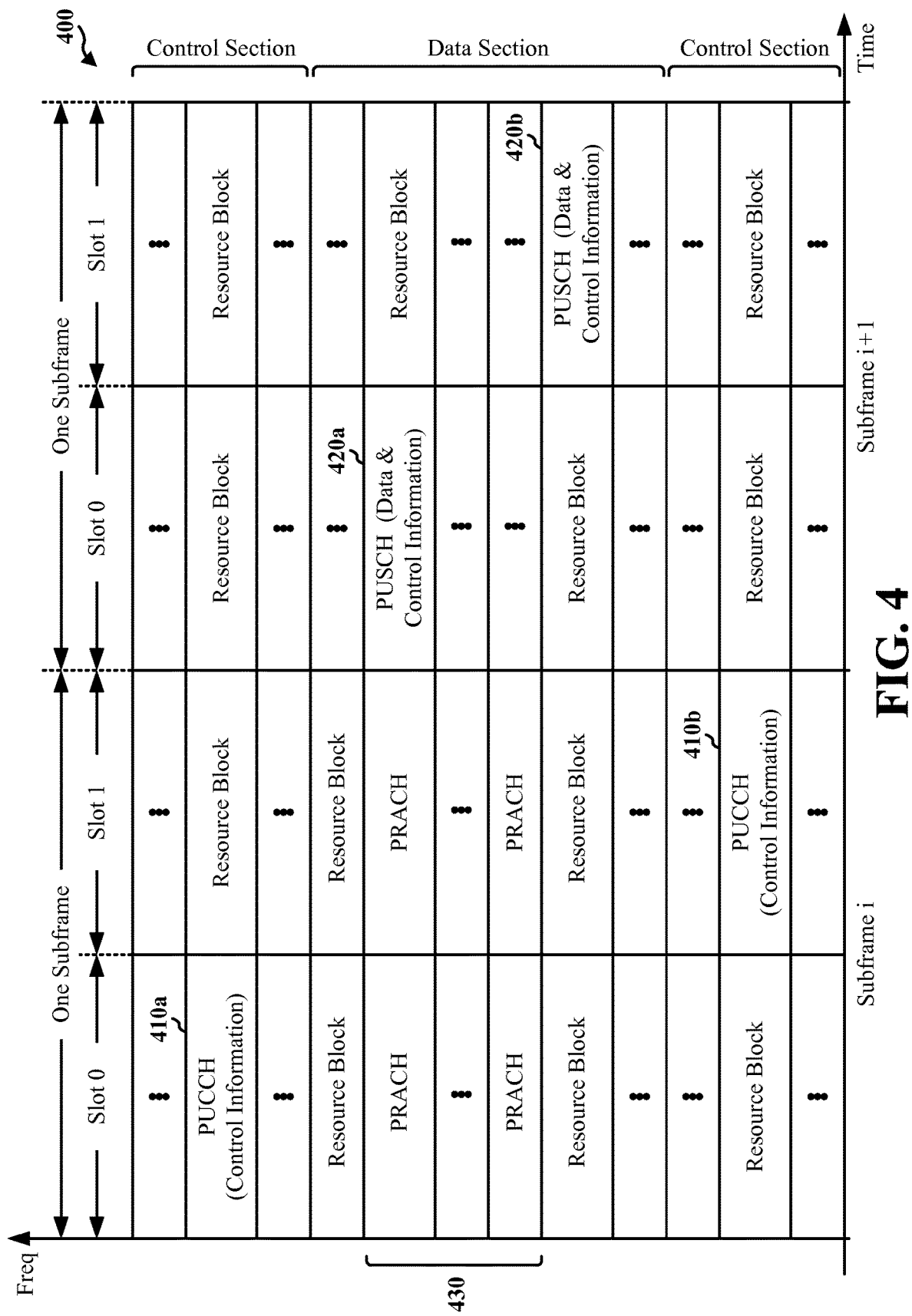
FIG. 4 is a diagram illustrating an example of a UL frame structure in LTE.

FIG. 4 is a diagram 400 illustrating an example of a UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes, and a UE can make a single PRACH attempt per frame (10 ms).

Figure 5:
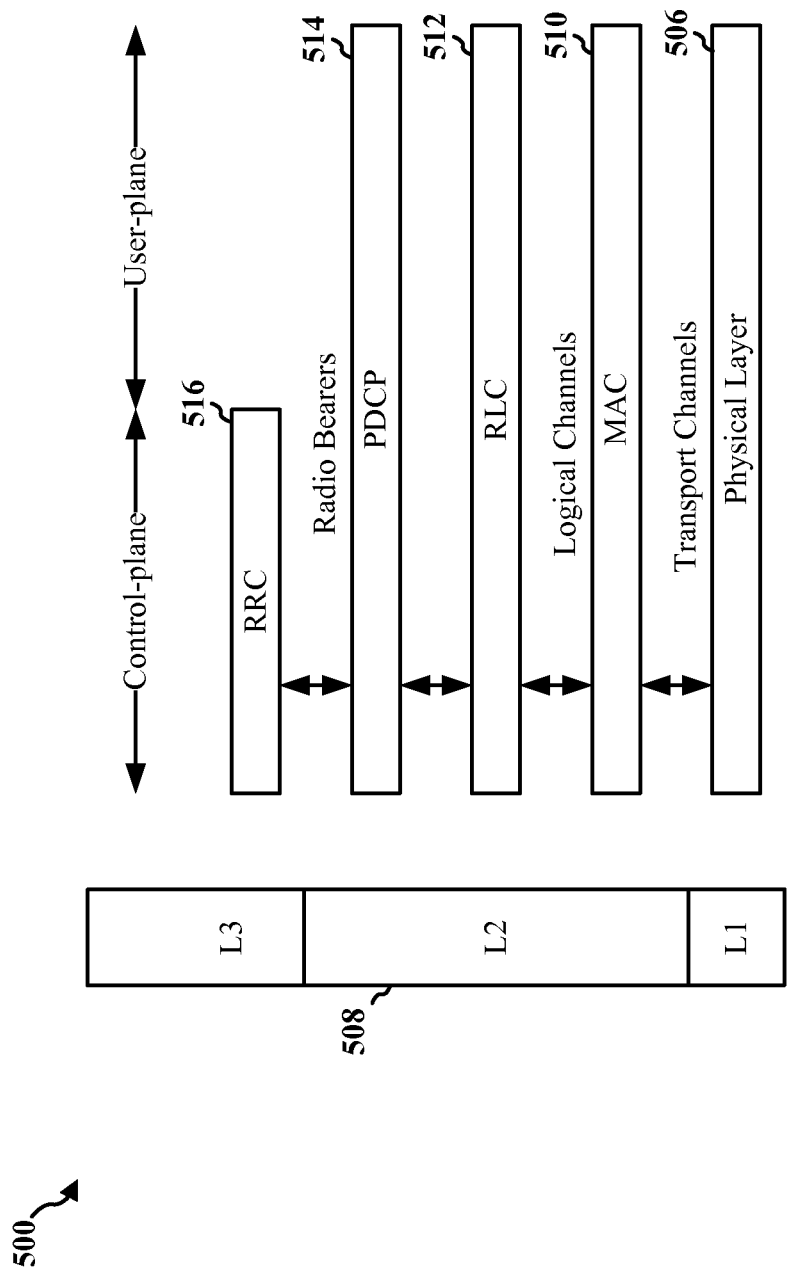
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
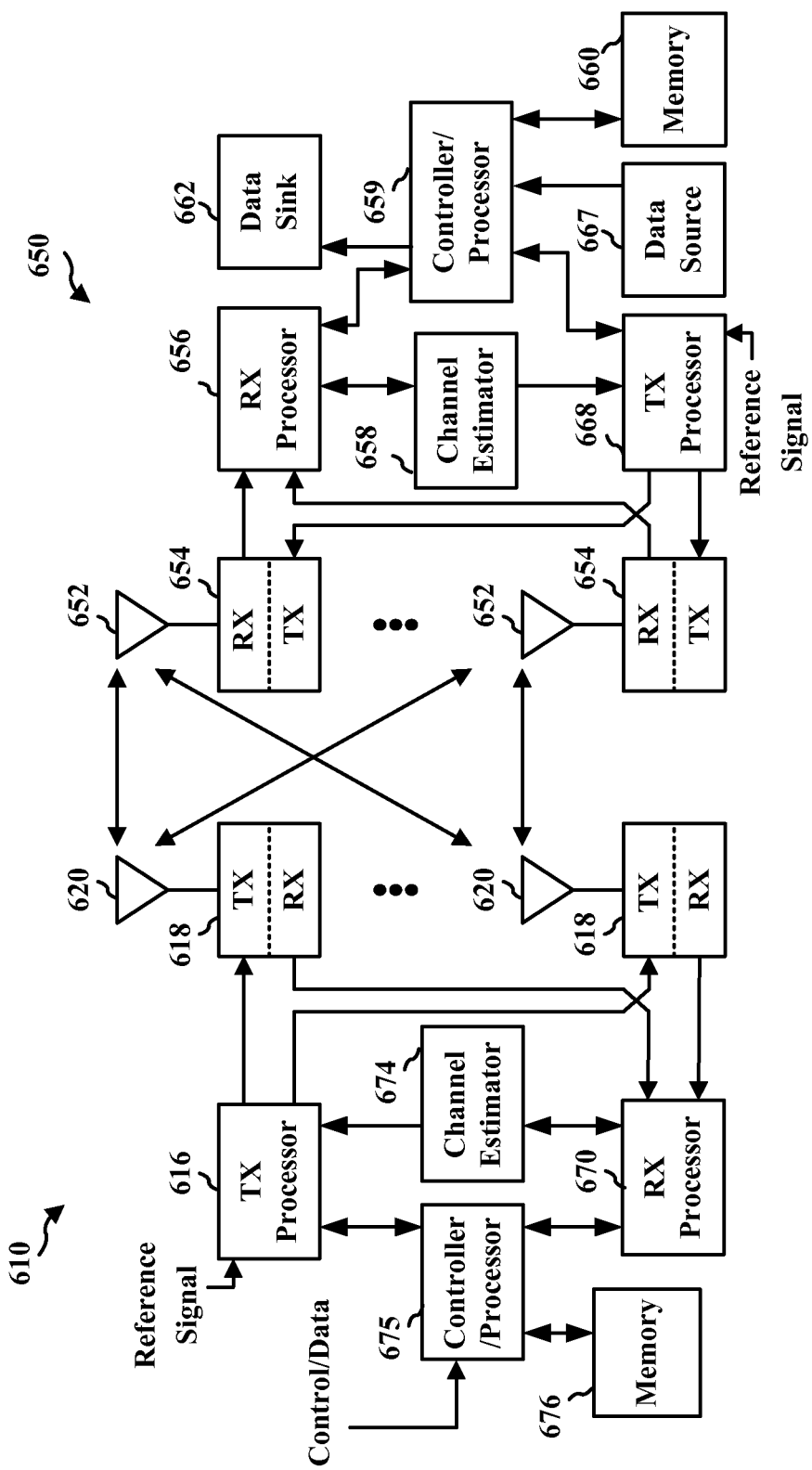
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier and the reference signal are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgment (ACK) and/or negative acknowledgment (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to an RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The systems and methods described herein may be implemented in the system of FIG. 6. For example, an apparatus, e.g., at eNBs 610, may synchronize the UE 650 using the first external timing source based timing signal when the first external timing source timing signal is available. Additionally, the apparatus transmits a synchronization signal indicating that the first UE is synchronized using the external timing source timing signal.

Another example apparatus, e.g., UE 650, receives one or more synchronization signals including synchronization information indicating a priority of the synchronization signals. Additionally, the apparatus determines which of the one or more synchronization signals to synchronize on based on the information indicating the priority of the synchronization signal. The apparatus also synchronizes on one of the one or more synchronization signals.

Figure 7:
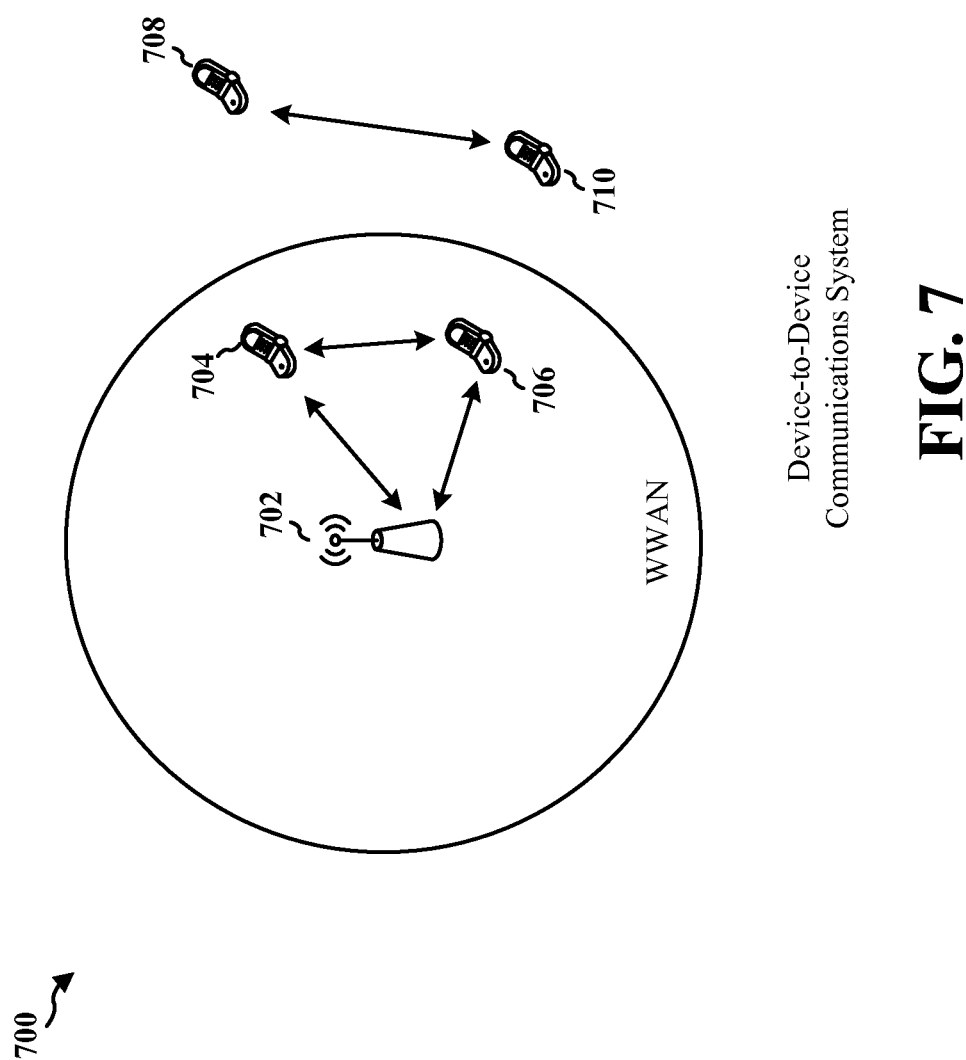
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as, for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 8:
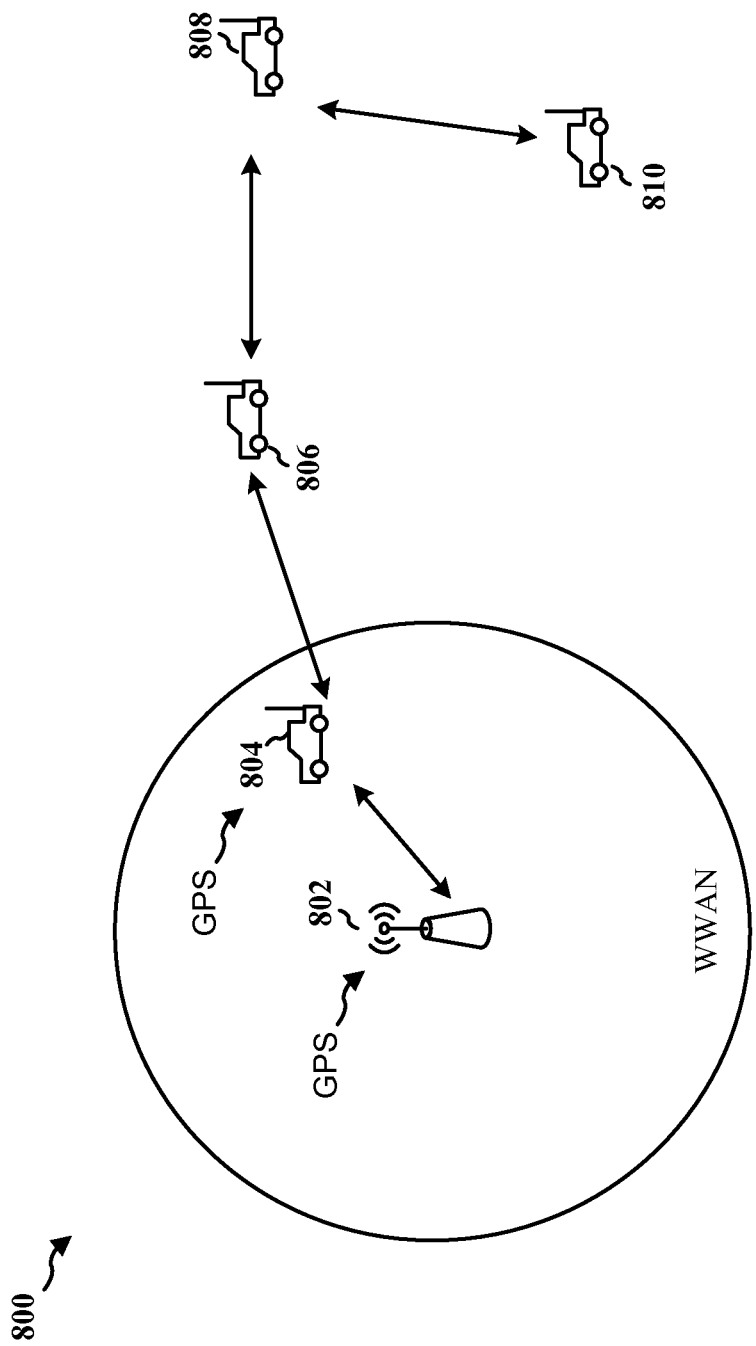
FIG. 8 is a diagram of a device-to-device communications system for synchronizing a UE or other electronic device in accordance with some aspects of the present disclosure.

FIG. 8 is a diagram of a device-to-device communications system 800 for synchronizing a UE or other electronic device in accordance with some aspects of the present disclosure. Some examples may be used for synchronization for LTE-D based vehicle-to-vehicle communication (V2V). Accordingly, symbols indicating vehicles 804, 806, 808, 810 are used. It will be understood that each vehicle 804, 806, 808, 810 will generally include electronic communications equipment, such as a UE implementing one or more aspects of the systems and methods described herein.

Some vehicles 804, 806, 808, 810 and base station 802 communicate directly. For example, the example device-to-device communication system 800 includes a base station 802 that is in communication with the vehicle 804. The vehicle 804 is in communication with the vehicle 806. The vehicle 806 is in communication with the vehicle 808. The vehicle 808 is in communication with the vehicle 810.

In the illustrated example, any of the base station 802 and vehicles 804, 806, 808, 810 that cannot communicate directly may communicate by relaying signals. For example, the base station 802 may transmit a communication to the vehicle 810 by sending the communication to vehicle 804. The vehicle 804 may then act as a relay and transmit the communication to the vehicle 806. Similarly, the vehicle 806 may then act as a relay and transmit the communication to the vehicle 808. The vehicle 808 may then act as a relay and transmit the communication to the vehicle 810. Synchronization information may be relayed from device-to-device, e.g., communication equipment in each of the vehicles 804, 806, 808, 810 in the same or a similar manner. Each communication between a device, e.g., base station 802 to vehicle 804, vehicle 804 to vehicle 806, vehicle 806 to vehicle 808, vehicle 808 to vehicle 810, as well as any return communications, e.g., vehicle 810 to vehicle 808, vehicle 808 to vehicle 806, vehicle 806 to vehicle 84, and vehicle 804 to base station 802, may be referred to as a "hop."

In some examples, the systems and methods described herein may be used for synchronization for LTE-D based V2V communication systems by leveraging GNSS timing signals. It will be understood, however, that other timing signals may be used, as described herein.

LTE-D Release 12 defined distributed synchronization with the following hierarchy: (1) eNB, (2) in-coverage UE, (3) out of coverage UE synchronized to an in coverage UE, (4) out of coverage UE. To distinguish between in and out of coverage UEs, following techniques may be used: (a) different synchronization sequences and (b) 1-bit in PSBCH channel.

As described herein, in some examples, the above distributed synchronization hierarchy may be extended to allow support for synchronization to GNSS or other timing related signals and multi-hop propagation of the timing related signals. Some examples may provide signaling and protocol changes needed to allow for support for synchronization to GNSS or other timing related signals and multi-hop propagation of the timing related signals.

In some examples, a proposed protocol for a UE may have the following synchronization priority: (1) GNSS, (2) UE synchronized to GNSS up to some maximum number of hops, optionally, (3a) eNB, (3b) in-coverage UE, and/or (3c) out of coverage UE synchronized to an in coverage UE, and (4) out of coverage UE.

As illustrated in FIG. 8, GNSS may be used to synchronize the communications equipment in vehicle 804 and/or base station 802. The communication equipment in vehicle 804 (for example), which may be a UE, that may be used to synchronize communication equipment in other vehicles 806, 808, 810 to GNSS up to a maximum number of hops. For example, when three hops are allowed, communication equipment in vehicle 810 may be synchronized over the illustrated communication links. When only two hops are allowed, communication equipment in vehicle 810 may not be synchronized over the illustrated communication links, for example. It will be understood that one, two, three, four, five, or even more hops may be used, depending on the particular example implementation.

The systems and methods described herein may use one or more of the following signaling changes to indicate that UE synchronized to GNSS: in a first option, a fixed sidelink synchronization sequence (PSSS/SSSS) is used for timing propagated by GNSS. An example may use 1 bit in the "reserved field" in PSBCH to indicate whether a UE is synchronized directly to GNSS or not (or other types of synchronization).

In a second option, a bit in the reserved field is used to indicate whether GNSS synchronized (or other types of synchronization) or not and another bit to indicate whether directly synchronized to GNSS (or other types of synchronization) or not. An example device may be synchronized using GNSS signals directly or based on GNSS signals received and processed by another device. For example, as illustrated in FIG. 8, GNSS signals may be received at base station 802. These GNSS signals may provide timing information to the base station 802 that may be propagated to the communications equipment in vehicles 804, 806, 808, 810. Vehicle 804 may include equipment to process GNSS signals. Accordingly, vehicle 804 may also propagate timing information to the communications equipment in the other vehicles 806, 808, 810.

The systems and methods described herein may use one or more of the following signaling changes to allow for single frequency network (SFN) transmissions. In a first example, UEs may be directly synchronized to GNSS using the resource given by a variable such as "syncOffsetIndicator1." UEs may indirectly synchronize to GNSS using the resource given by a variable such as "syncOffsetIndicator2." A fixed CRC mask may be applied using PSBCH to indicate a V2V transmission. In an example, another reserved bit in PSBCH may be set to '1'indicate a V2V or a future release transmission.

Figure 9:
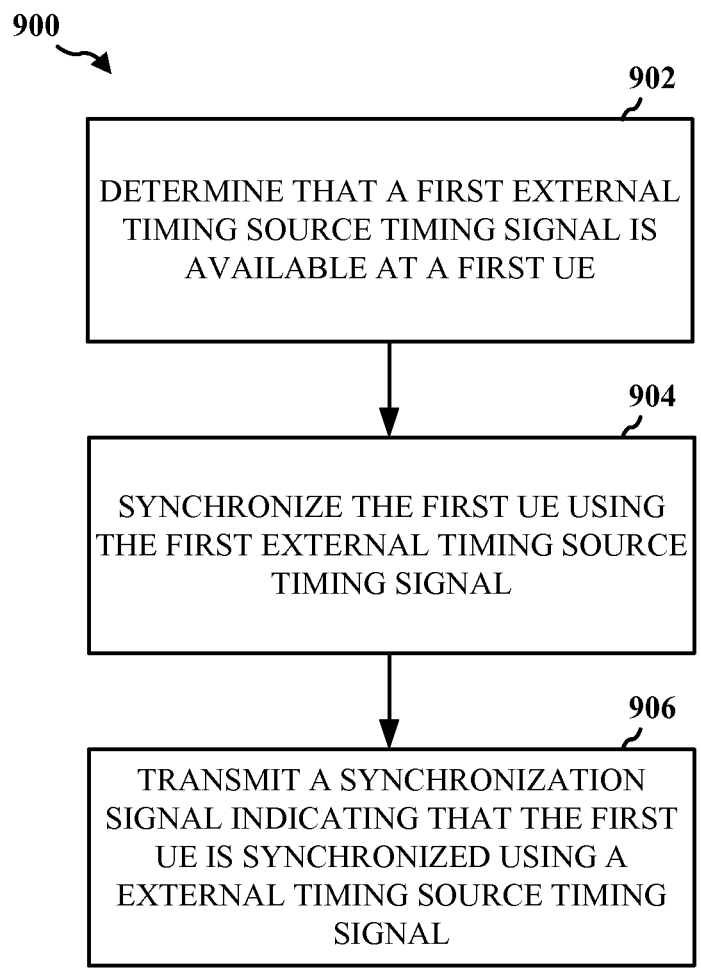
FIG. 9 is a flowchart of an example method for synchronizing a UE or other electronic device in accordance with some aspects of the present disclosure. F

FIG. 9 is a flowchart 900 of an example method for synchronizing a UE or other electronic device in accordance with some aspects of the present disclosure. In some examples, the method may be performed by a UE, such as UE 102 of FIG. 1, UE 206 of FIG. 2, or UE 650 of FIG. 6. It will be understood, however, that other electronic devices may also perform the method if the electronic device is capable of receiving a timing signal and transmit a synchronization signal, for example.

At block 902 a first UE determines that a first external timing source timing signal is available at the first UE. The external timing signal may be, for example, signals including, but are not limited to Global Navigation Satellite System (GNSS) signals such as global positioning system (GPS) signals, Global Navigation Satellite System (GLONASS) signals, Galileo signals, BeiDou signals, or other satellite based navigation system signals. Timing signals may also be transmitted from terrestrial based systems. In some examples, timing signals may be sent by other network devices, such as from the eNodeB 106 of FIG. 1, the eNodeB 204 of FIG. 2, or the eNodeB 610 of FIG. 6. The timing signal from the eNodeB 106, 204, or 610 may be generated locally or received from other timing sources. For example, the eNodeB 106, 204, or 610 may generate a timing signal based on GNSS or other signals. In other examples, a device external to the eNodeB 106, 204, or 610 may determine that a first external timing source timing signal is available at the first UE.

In some examples, one or more of receivers 654RX receive information allowing UE 650 to determine that a first external timing source timing signal is available at the first UE, e.g., UE 650. The processing to make the determination may be performed by one or more processors, such as RX processor 656 or other processing circuitry.

At block 904 the first UE 102, 206, or 650 is synchronized using the first external timing source timing signal when the first external timing source timing signal is available. The synchronization may be performed internally to the UE 102, 206, or 650. For example, the UE 102, 206, or 650 may include timing circuitry. The timing of the timing circuitry in the UE 102, 206, or 650 may be synchronized with the timing signal, e.g., a GNSS signal. In other examples, a device external to the UE 102, 206, or 650 may cause the UE to be synchronized.

In some examples, one or more of receivers 654RX receive information allowing UE 650 to synchronize using the first external timing source timing signal when the first external timing source timing signal is available at the first UE, e.g., UE 650. The processing to perform the synchronization may be performed by one or more processors, such as RX processor 656 or other processing circuitry. In some examples, one or more of receivers 618RX receive information allowing eNodeB 610 to synchronize the UE 650 using the first external timing source timing signal when the first external timing source timing signal is available at the first UE. The processing to make the determination may be performed by one or more processors, such as RX processor 670 or other processing circuitry.

At block 906 a device, such as the first UE, e.g., the UE 102, 206, or 650 or a device external to the UE 102, 206, or 650 may transmit a synchronization signal indicating that the first UE is synchronized using the external timing source timing signal. In some examples, the synchronization signal may be a fixed synchronization sequence. Additionally, the synchronization signal may include a reserved bit. The reserved bit may be in a physical sidelink broadcast channel.

Additionally, in some examples, the reserved bit may indicate that the first UE is synchronized directly to the external timing source. For example, the first UE may be synchronized directly to a GNSS signal. The reserved bit may be used to indicate that the first UE is synchronized indirectly to an external timing source through another UE. For example, the UE may be synchronized to timing signals from another UE that is synchronized using GNSS signals.

In some examples, one or more of transmitters 654TX transmit information indicating that the first UE, e.g., UE 650 is synchronized using the external timing source timing signal. The related processing may be performed by one or more processors, such as TX processor 668 or other processing circuitry. In some examples, one or more of transmitters 618TX transmit information indicating that the first UE, e.g., UE 650 is synchronized using the external timing source timing signal. The related processing may be performed by one or more processors, such as TX processor 616 or other processing circuitry.

The synchronization signal may be transmitted on a resource indicated by a first synchronization offset indicator when the first UE is synchronized directly to an external timing source. In some examples, the synchronization signal is transmitted on a resource indicated by a second synchronization offset indicator when the first UE is synchronized indirectly to an external timing source through another UE. In some examples, the synchronization signal may include applying a fixed cyclic redundancy code (CRC) mask to a physical sidelink broadcast channel.

Figure 10:
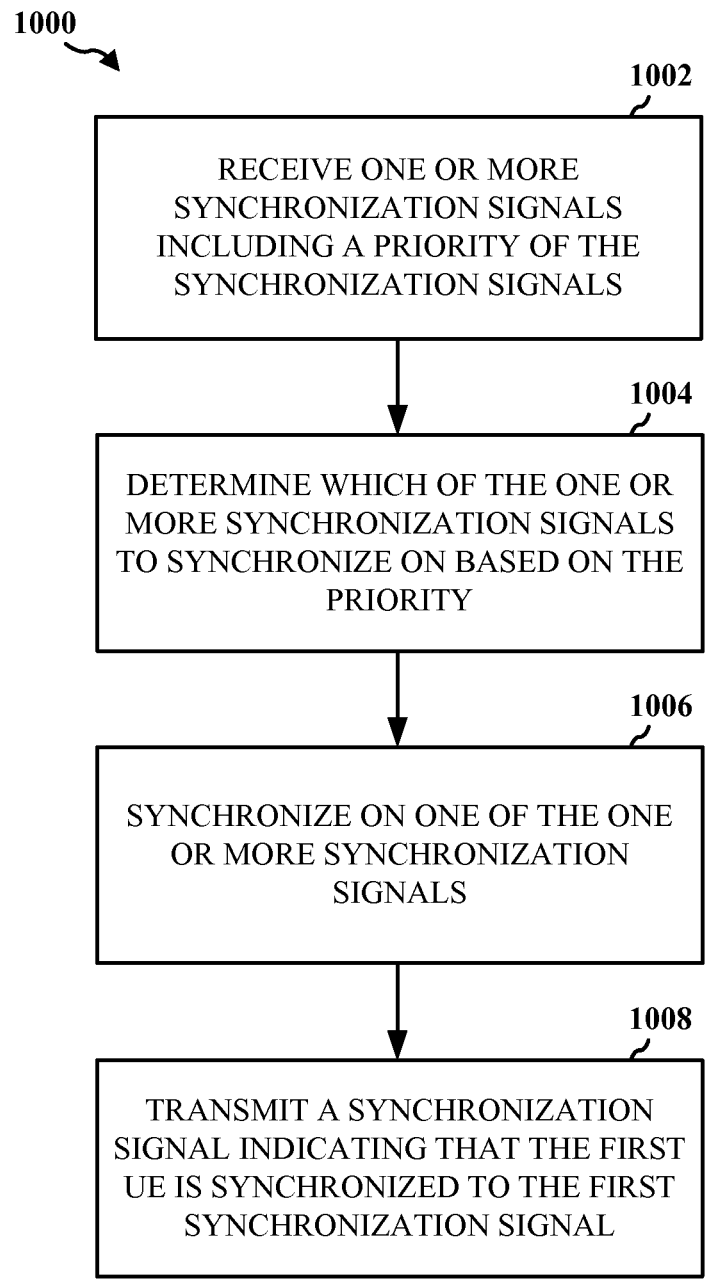
FIG. 10 is a flowchart of a method for synchronizing a UE or other electronic device at a receiver in accordance with some aspects of the present disclosure.

FIG. 10 is a flowchart 1000 of a method for synchronizing a UE or other electronic device at a receiver in accordance with some aspects of the present disclosure. In some examples, the method may be performed by a UE, such as UE 102 of FIG. 1, UE 206 of FIG. 2, or UE 650 of FIG. 6, to name a few. It will be understood, however, that other electronic devices may also perform the method if the electronic device is capable of receiving a timing signal and transmit a synchronization signal, for example.

At block 1002, a first UE 102, 206, 650 receives one or more synchronization signals including information indicating the priority of the synchronization signal. The priority information may be based on whether the synchronization signal is or is not based on a GNSS signal. The information about whether the synchronization signal is or is not based on a GNSS signal may be in the sequence or in a first reserved field of a physical sidelink broadcast channel (PSBCH).

In some examples, one or more of receivers 654RX receive one or more synchronization signals including information indicating the priority of the synchronization signal at the first UE, e.g., UE 650. The processing to make the determination may be performed by one or more processors, such as RX processor 656 or other processing circuitry.

In some examples, the priority information is further based on whether the synchronization signal is directly based on GNSS or the synchronization signal is indirectly based on GNSS. The priority information about whether the synchronization signal is directly based on GNSS or the synchronization signal is indirectly based on GNSS may be in a second reserved field of PSBCH.

In an example, block 1002, a first UE 102, 206, 650 receiving one or more synchronization signals including information indicating the priority of the synchronization signal may further include checking the decoded PSBCH with a fixed cyclic redundancy check (CRC) mask.

In some examples, one or more of receivers 654RX receive one or more synchronization signals including information indicating the priority of the synchronization signal at the first UE, e.g., UE 650. The processing to make the determination may be performed by one or more processors, such as RX processor 656 or other processing circuitry.

At a block 1004, the first UE 102, 206, 650 determines which of the one more synchronization signals to synchronize on based on information indicating the priority of the synchronization signal. In one example of a proposed protocol, a UE, such as UE 102 of FIG. 1, UE 206 of FIG. 2, or UE 650 of FIG. 6 may use the following synchronization priority: (1) GNSS, (2) UE synchronized based on a GNSS synchronization of another UE up to some maximum number of transmissions between multiple UEs away (e.g., "hops"), (3) optionally one or more of (3a) eNB, (3b) in-coverage UE, and/or (3c) out of coverage UE synchronized to an in coverage UE, and (4) out of coverage UE. The example proposed protocol is only intended as one example. Other example protocols may rearrange the order of the priority of the signals, may include other synchronization signals, e.g., GNSS signals, GLONASS signals, Galileo signals, BeiDou signals, or other satellite based navigation system signals, or terrestrial signals, may not include some or all of the signals listed above, or may use entirely different synchronization signals to synchronize on. It will be understood, however, that the concepts described herein may still be applied to such synchronization signals.

In some examples, one or more processors, such as RX processor 656 or other processing circuitry may determine which of the one more synchronization signals to synchronize on based on information indicating the priority of the synchronization signal.

At block 1006, the UE 102, 206, 650 synchronizes to a first one of the one or more synchronization signals based on the priority order. For example, UE 102, 206, 650 may synchronize based one or more of GNSS, GNSS, GLONASS, Galileo, BeiDou, other satellite based navigation system signals, or terrestrial signals. The synchronization may be based on signals received directly or indirectly. In some examples, a UE 102, 206, 650 may be synchronized based on a GNSS synchronization of another UE 102, 206, 650 up to some maximum number of transmissions between multiple UEs away (e.g., "hops"). Synchronization may be based on one or more of eNBs, including in coverage UE, and/or out of coverage UE synchronized to an in coverage UE, or out of coverage UE. In some examples, one or more processors, such as RX processor 656 or other processing circuitry may synchronize UE 650 to one of the one or more synchronization signals.

At block 1008, the UE 102, 206, 650 transmits a synchronization signal indicating that the first UE is synchronized to the first synchronization signal. In some examples, the synchronization signal includes a fixed synchronization sequence. In some examples, the synchronization signal comprises a reserved bit. The reserved bit may be in a physical sidelink broadcast channel in some examples. The reserved bit may indicate that the first UE is synchronized directly to a GNSS based timing signal and/or the reserved bit may indicate that the first UE is synchronized indirectly to a GNSS based timing signal through another UE.

In some examples, the synchronization signal is transmitted on a resource indicated by a first synchronization offset indicator when the first UE is synchronized directly to a GNSS based timing signal. In some examples, the synchronization signal is transmitted on a resource indicated by a second synchronization offset indicator when the first UE is synchronized indirectly to a GNSS based timing signal through another UE. Some examples may apply a fixed CRC mask to a physical sidelink broadcast channel. Using the synchronization signal may include applying a fixed CRC mask to a physical sidelink broadcast channel.

Means for determining that a first external timing source timing signal is available at the first UE may include one or more of receivers 618RX receive information allowing eNodeB 610 to determine that a first external timing source timing signal is available at the first UE. The processing to make the determination may be performed by one or more processors, such as RX processor 670 or other processing circuitry. In some examples, one or more of receivers 654RX receive information allowing UE 650 to determine that a first external timing source timing signal is available at the first UE, e.g., UE 650. The processing to make the determination may be performed by one or more processors, such as RX processor 656 or other processing circuitry.

Means for synchronizing using the first external timing source timing signal when the first external timing source timing signal is available may include timing circuitry in the UE 106, 204, or 610 that may be modified to match, e.g., be synchronized with, the timing signal, e.g., a GNSS signal. In some examples, the means for synchronizing using the first external timing source timing signal when the first external timing source timing signal is available may include one or more of receivers 654RX receive information allowing UE 650 to synchronize using the first external timing source timing signal when the first external timing source timing signal is available at the first UE, e.g., UE 650. The processing to perform the synchronization may be performed by one or more processors, such as RX processor 656 or other processing circuitry. In some examples, one or more of receivers 618RX receive information allowing eNodeB 610 to synchronize the UE 650 using the first external timing source timing signal when the first external timing source timing signal is available at the first UE at the first UE. The processing to make the determination may be performed by one or more processors, such as RX processor 670 or other processing circuitry.

The means for transmitting a synchronization signal indicating that the first UE is synchronized using the external timing source timing signal may include one or more of transmitters 654TX transmit information indicating that the first UE, e.g., UE 650 is synchronized using the external timing source timing signal. The related processing may be performed by one or more processors, such as TX processor 668 or other processing circuitry.

In some examples, the means for transmitting a synchronization signal indicating that the first UE is synchronized using the external timing source timing signal may include one or more of transmitters 618TX transmit information indicating that the first UE, e.g., UE 650 is synchronized using the external timing source timing signal. The related processing may be performed by one or more processors, such as TX processor 616 or other processing circuitry.

The means for receiving one or more synchronization signals including information indicating the priority of the synchronization signal may include one or more of receivers 654RX receive one or more synchronization signals including information indicating the priority of the synchronization signal at the first UE, e.g., UE 650. The processing to make the determination may be performed by one or more processors, such as RX processor 656 or other processing circuitry.

The means for determining which of the one of the one or more synchronization signals to synchronize on based on information indicating the priority of the synchronization signal may include one or more processors, such as RX processor 656 or other processing circuitry may determine which of the one of the one or more synchronization signals to synchronize on based on information indicating the priority of the synchronization signal. The means for synchronizing to one of the one or more synchronization signals one or more processors, such as RX processor 656 or other processing circuitry may synchronizes UE 650 to one of the one or more synchronization signals. It will be understood that the example means for implementing the systems and methods described herein that are only intended to be examples of the circuitry that may implement the systems and methods described herein.

In some examples, the means for receiving one or more synchronization signals including synchronization information indicating a priority of the synchronization signals at the first UE may include one or more of receivers 654RX receive one or more synchronization signals including information indicating the priority of the synchronization signal at the first UE, e.g., UE 650. The processing to make the determination may be performed by one or more processors, such as RX processor 656 or other processing circuitry.

In some examples, the means for determining which of the one or more synchronization signals to synchronize on based on the information indicating the priority of the synchronization signal may include one or more processors, such as RX processor 656 or other processing circuitry may determine which of the one of the one or more synchronization signals to synchronize on based on information indicating the priority of the synchronization signal.

In some examples, the means for synchronizing to a first synchronization signal of the one or more synchronization signals based on the determined priority order may include one or more of receivers 654RX receive information allowing UE 650 to synchronize using the first external timing source timing signal when the first external timing source timing signal is available at the first UE, e.g., UE 650. The processing to perform the synchronization may be performed by one or more processors, such as RX processor 656 or other processing circuitry.

In some examples, the means for transmitting a synchronization signal indicating that the first UE is synchronized to the first synchronization signal may include one or more of transmitters 618TX transmit information indicating that the first UE, e.g., UE 650 is synchronized using the external timing source timing signal. The related processing may be performed by one or more processors, such as TX processor 616 or other processing circuitry.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), the method comprising:
    synchronizing the UE using a Global Navigation Satellite System (GNSS) based timing signal when the GNSS based timing signal is available, wherein synchronization is based on a hierarchy that prioritizes synchronization of the UE indirectly with the GNSS up to a threshold quantity of multiple hops over synchronization of the UE directly with a base station; and
    transmitting a synchronization signal indicating that the UE is synchronized, the synchronization using the GNSS based timing signal, wherein the transmitting of the synchronization signal further indicates that the UE is at least one of synchronized directly or indirectly to the GNSS based timing signal based on a resource used to transmit the synchronization signal,
    wherein the synchronization signal is transmitted on a first resource indicated by a first synchronization offset indicator when the UE is synchronized indirectly to the GNSS based timing signal through another UE, and
    wherein the synchronization signal is transmitted on a second resource indicated by a second synchronization offset indicator when the UE is synchronized directly to the GNSS based timing signal.

2. The method of claim 1, wherein the synchronization signal comprises a fixed synchronization sequence.

3. The method of claim 1, wherein the synchronization signal comprises a reserve bit in a reserved field in a physical sidelink broadcast channel (PSBCH), the reserve bit indicating whether the UE is directly synchronized to the GNSS based timing signal or indirectly synchronized to the GNSS based timing signal.

4. The method of claim 3, further comprising applying a fixed cyclic redundancy code (CRC) mask to the PSBCH.

5. The method of claim 1, further comprising determining that the GNSS based timing signal is available at the UE, the UE being capable of directly synchronizing with the GNSS based timing signal, and
    wherein the hierarchy prioritizes synchronization of the UE directly with the GNSS over synchronization of the UE indirectly with the GNSS up to the threshold quantity of multiple hops.

6. An apparatus for wireless communication, comprising:
a memory; and
at least one processor coupled to the memory and configured to:
    synchronize the apparatus using a Global Navigation Satellite System (GNSS) based timing signal when the GNSS based timing signal is available, wherein synchronization is based on a hierarchy that prioritizes synchronization of the apparatus indirectly with the GNSS up to a threshold quantity of multiple hops over synchronization of the apparatus directly with a base station; and
    transmit a synchronization signal indicating that the apparatus is synchronized, the synchronization using the GNSS based timing signal, wherein the transmitting of the synchronization signal further indicates that the apparatus is at least one of synchronized directly or indirectly to the GNSS based timing signal based on a resource used to transmit the synchronization signal,
    wherein the synchronization signal is transmitted on a first resource indicated by a first synchronization offset indicator when the apparatus is synchronized indirectly to the GNSS based timing signal through a user equipment, and
    wherein the synchronization signal is transmitted on a second resource indicated by a second synchronization offset indicator when the apparatus is synchronized directly to the GNSS based timing signal.

7. The apparatus of claim 6, wherein the synchronization signal comprises a fixed synchronization sequence.

8. The apparatus of claim 6, wherein the synchronization signal comprises a reserve bit in a reserved field in a physical sidelink broadcast channel (PSBCH), the reserve bit indicating whether the apparatus is directly synchronized to the GNSS based timing signal or indirectly synchronized to the GNSS based timing signal.

9. The apparatus of claim 8, wherein the at least one processor is further configured to apply a fixed CRC mask to the PSBCH.

10. The apparatus of claim 6, wherein the at least one processor is further configured to determine that the GNSS based timing signal is available at the apparatus, the apparatus being capable of directly synchronizing with the GNSS based timing signal, and
    wherein the hierarchy prioritizes synchronization of the apparatus directly with the GNSS over synchronization of the apparatus indirectly with the GNSS up to the threshold quantity of multiple hops.

11. An apparatus for wireless communication, comprising:
means for synchronizing the apparatus using a Global Navigation Satellite System (GNSS) based timing signal when the GNSS based timing signal is available, wherein synchronization is based on a hierarchy that prioritizes synchronization of the apparatus indirectly with the GNSS up to a threshold quantity of multiple hops over synchronization of the apparatus directly with a base station; and
means for transmitting a synchronization signal indicating that the apparatus is synchronized, the synchronization using the GNSS based timing signal, wherein the transmitting of the synchronization signal further indicates that the apparatus is at least one of synchronized directly or indirectly to the GNSS based timing signal based on a resource used to transmit the synchronization signal,
wherein the synchronization signal is transmitted on a first resource indicated by a first synchronization offset indicator when the apparatus is synchronized indirectly to the GNSS based timing signal through a user equipment, and wherein the synchronization signal is transmitted on a second resource indicated by a second synchronization offset indicator when the apparatus is synchronized directly to the GNSS based timing signal.

12. The apparatus of claim 11, wherein the synchronization signal comprises a fixed synchronization sequence.

13. The apparatus of claim 11, further comprising means for determining that the GNSS based timing signal is available at the apparatus, the apparatus being capable of directly synchronizing with the GNSS based timing signal, and wherein the synchronization signal comprises a reserve bit in a reserved field in a physical sidelink broadcast channel (PSBCH), the reserve bit indicating whether the apparatus is directly synchronized to the GNSS based timing signal or indirectly synchronized to the GNSS based timing signal.

14. The apparatus of claim 13, further comprising means for applying a fixed cyclic redundancy code (CRC) mask to the PSBCH.

15. The apparatus of claim 11, wherein the hierarchy prioritizes synchronization of the apparatus directly with the GNSS over synchronization of the apparatus indirectly with the GNSS up to the threshold quantity of multiple hops.

16. A non-transitory computer-readable medium storing computer executable code, the code when executed by a processor of an apparatus, causes the processor to:

synchronize the apparatus using a Global Navigation Satellite System (GNSS) based timing signal when the GNSS based timing signal is available, wherein synchronization is based on a hierarchy that prioritizes synchronization of the apparatus indirectly with the GNSS up to a threshold quantity of multiple hops over synchronization of the apparatus directly with a base station; and transmit a synchronization signal indicating that the apparatus is synchronized, the synchronization using the GNSS based timing signal, wherein the transmitting of the synchronization signal further indicates that the apparatus is at least one of synchronized directly or indirectly to the GNSS based timing signal based on a resource used to transmit the synchronization signal, wherein the synchronization signal is transmitted on a first resource indicated by a first synchronization offset indicator when the apparatus is synchronized indirectly to the GNSS based timing signal through a user equipment, and wherein the synchronization signal is transmitted on a second resource indicated by a second synchronization offset indicator when the apparatus is synchronized directly to the GNSS based timing signal.

17. The non-transitory computer-readable medium of claim 16, wherein the synchronization signal comprises a fixed synchronization sequence.

18. The non-transitory computer-readable medium of claim 16, wherein the processor is further configured to determine that the GNSS based timing signal is available at the apparatus, the apparatus being capable of directly synchronizing with the GNSS based timing signal, and wherein synchronization signal comprises a reserve bit in a reserved field in a physical sidelink broadcast channel (PSBCH), the reserve bit indicating whether the apparatus is directly synchronized to the GNSS based timing signal or indirectly synchronized to the GNSS based timing signal.

19. The non-transitory computer-readable medium of claim 18, wherein the processor is further configured to apply a fixed cyclic redundancy code (CRC) mask to the PSBCH.

20. The non-transitory computer-readable medium of claim 16, wherein the hierarchy prioritizes synchronization of the apparatus directly with the GNSS over synchronization of the apparatus indirectly with the GNSS up to the threshold quantity of multiple hops.

* * * * *